United States Patent
Oh et al.

(10) Patent No.: US 10,423,023 B2
(45) Date of Patent: Sep. 24, 2019

(54) METHOD FOR PREPARING LIQUID CRYSTAL CAPSULE

(71) Applicant: LG CHEM, LTD., Seoul (KR)

(72) Inventors: Dong Hyun Oh, Daejeon (KR); Sung Joon Min, Daejeon (KR); Jung Sun You, Daejeon (KR); Kyung Jun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 111 days.

(21) Appl. No.: 15/038,651

(22) PCT Filed: Feb. 26, 2015

(86) PCT No.: PCT/KR2015/001877
§ 371 (c)(1),
(2) Date: May 23, 2016

(87) PCT Pub. No.: WO2015/130104
PCT Pub. Date: Sep. 3, 2015

(65) Prior Publication Data
US 2016/0299366 A1  Oct. 13, 2016

(30) Foreign Application Priority Data

Feb. 26, 2014 (KR) .................. 10-2014-0022463
Feb. 26, 2015 (KR) .................. 10-2015-0027199

(51) Int. Cl.
*G02F 1/1334* (2006.01)
*C09K 19/60* (2006.01)
(Continued)

(52) U.S. Cl.
CPC ............ *G02F 1/1334* (2013.01); *C09K 19/60* (2013.01); *C09K 2019/528* (2013.01); *G02F 1/13725* (2013.01)

(58) Field of Classification Search
None
See application file for complete search history.

(56) References Cited

U.S. PATENT DOCUMENTS 4,556,289 A    12/1985  Fergason
4,695,131 A *   9/1987  Balkwill ............... C07C 17/263
                                                    252/299.5
(Continued)

FOREIGN PATENT DOCUMENTS

CN      1764866 A      4/2006
JP    H01-285920 A    11/1989
(Continued)

OTHER PUBLICATIONS

Kang et al. "Optically-isotropic nanoencapsulated liquid crystal displays based on Kerr effect", Jun. 24, 2013, Optical Society of America, vol. 21 No. 13, 15719-15727. (Year: 2013).*
(Continued)

*Primary Examiner* — Cynthia H Kelly
*Assistant Examiner* — Anna Malloy
(74) *Attorney, Agent, or Firm* — Rothwell, Figg, Ernst & Manbeck, P.C.

(57) ABSTRACT

A method of preparing a liquid crystal capsule and the use of the liquid crystal capsule. The liquid crystal capsule has advantages in that transmittance and stability are improved and the degree of scattering is uniform.

21 Claims, 5 Drawing Sheets

(51) Int. Cl.
*C09K 19/52* (2006.01)
*G02F 1/137* (2006.01)

(56) References Cited

U.S. PATENT DOCUMENTS

| | | | | |
|---|---|---|---|---|
| 5,335,101 | A * | 8/1994 | Reamey | C09K 19/544 349/177 |
| 5,394,256 | A * | 2/1995 | Yamada | C09K 19/02 349/166 |
| 6,181,393 | B1 * | 1/2001 | Enomoto | G02F 1/133377 349/79 |
| 6,342,934 | B1 * | 1/2002 | Kameyama | G02B 5/3016 349/117 |
| 6,986,979 | B2 * | 1/2006 | Wang | B01J 13/18 428/402.21 |
| 2006/0147652 | A1 * | 7/2006 | Liu | C09K 19/544 428/1.31 |
| 2007/0087135 | A1 * | 4/2007 | Hayashi | C09K 19/3852 428/1.3 |
| 2009/0191361 | A1 * | 7/2009 | Hiji | C09K 19/544 428/1.1 |

FOREIGN PATENT DOCUMENTS

| | | |
|---|---|---|
| JP | H05-210094 A | 8/1993 |
| JP | H08-067878 A | 3/1996 |
| JP | H10-081882 A | 3/1998 |
| JP | 2005-002348 A | 1/2005 |
| JP | 2006-169463 A | 6/2006 |
| JP | 2008-074897 A | 4/2008 |
| JP | 2009-148707 A | 7/2009 |
| JP | 2009-172539 A | 8/2009 |
| JP | 2010-155887 A | 7/2010 |
| JP | 2010-211182 A | 9/2010 |
| KR | 10-2010-0065552 A | 6/2010 |
| KR | 20100065552 A * | 6/2010 |
| KR | 20100065552 A | 6/2010 |
| KR | 10-2011-0138585 A | 12/2011 |
| KR | 10-2013-0038455 A | 4/2013 |
| KR | 10-2013-0063485 A | 6/2013 |

OTHER PUBLICATIONS

Search Report issued for International Application No. PCT/KR2015/001877 dated May 14, 2015 (2 pages).
Office Action issued for Taiwan Patent Application No. 104106365 dated Jan. 21, 2016 along with English translation (7 pages).
Office Action issued for Japanese Patent Application No. 2016-524106 dated Jun. 13, 2017 (4 pages).
Seung-Gon Kang, et al., "Optically-isotropic nanoencapsulated liquid crystal displays based on Kerr effect", Optics Express, vol. 21, Issue 13, pp. 15719-15727 (2013).

* cited by examiner

[FIG. 1]
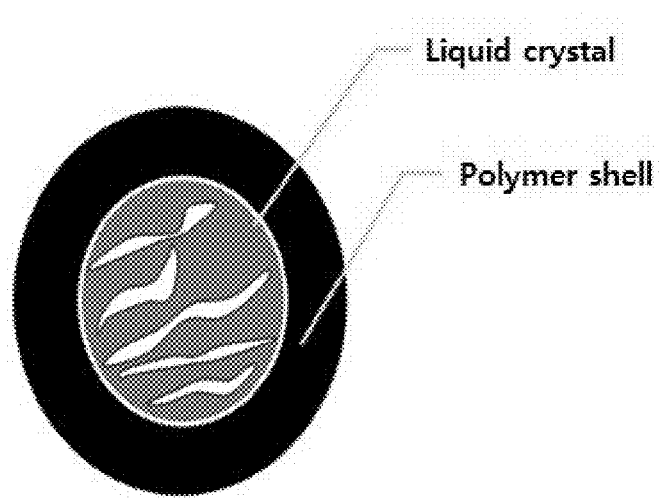

[FIG. 2]
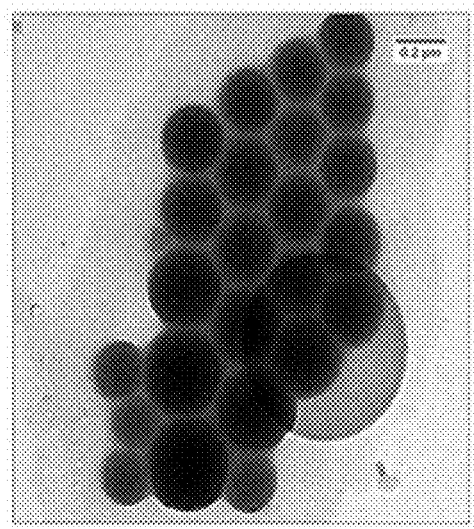
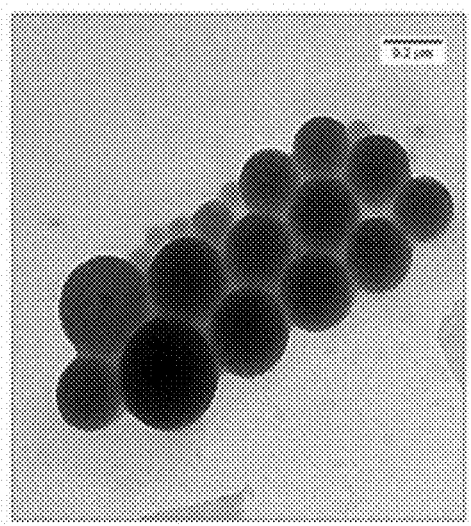
TEM images of LMC-3
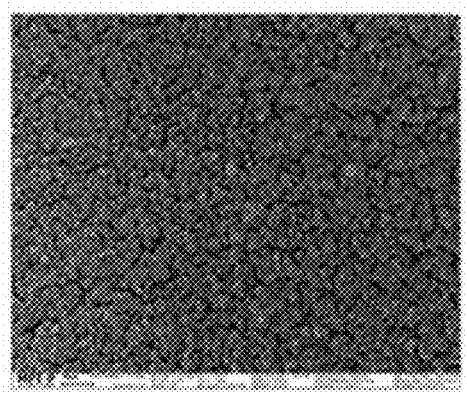
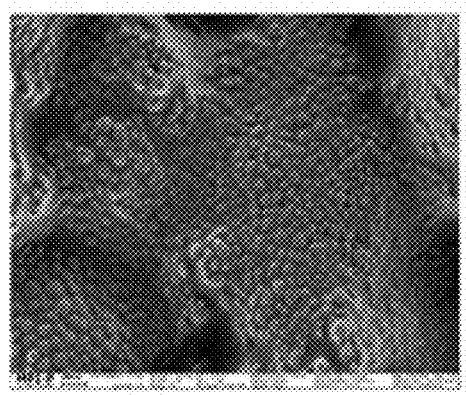
SEM images of LMC-3

[FIG. 3]
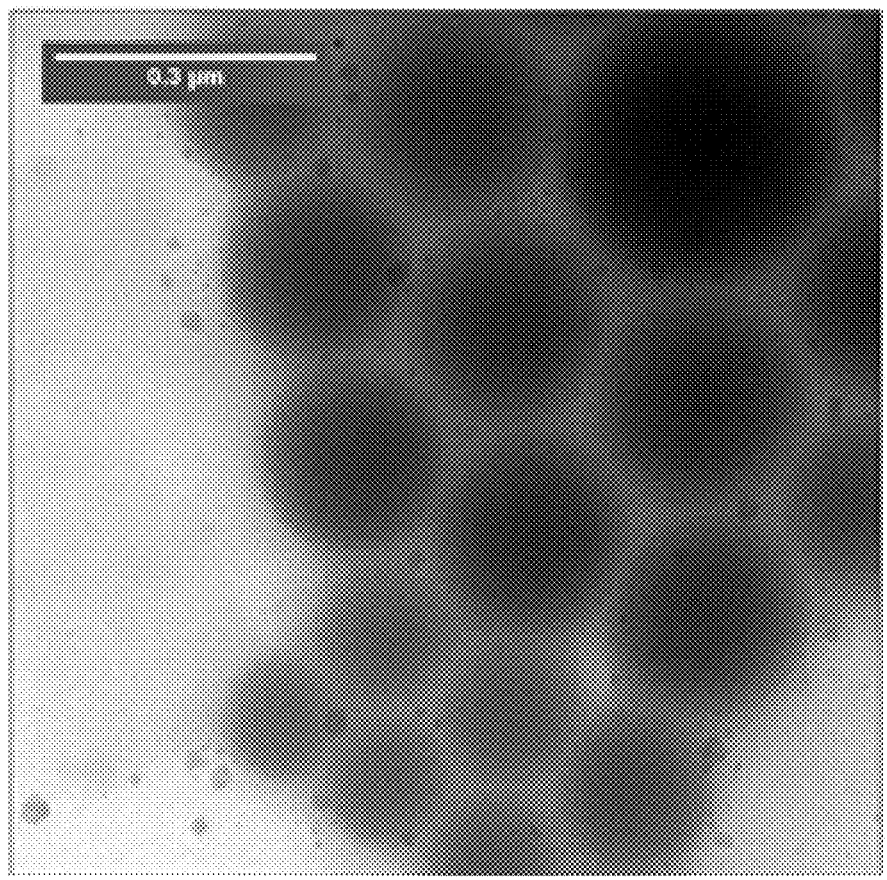

[FIG. 4]
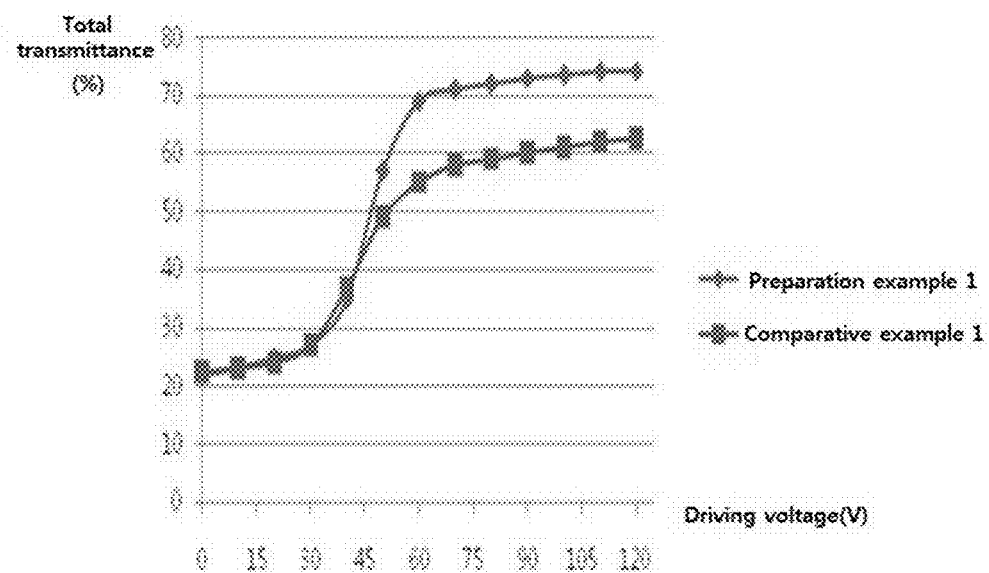
[FIG. 5]
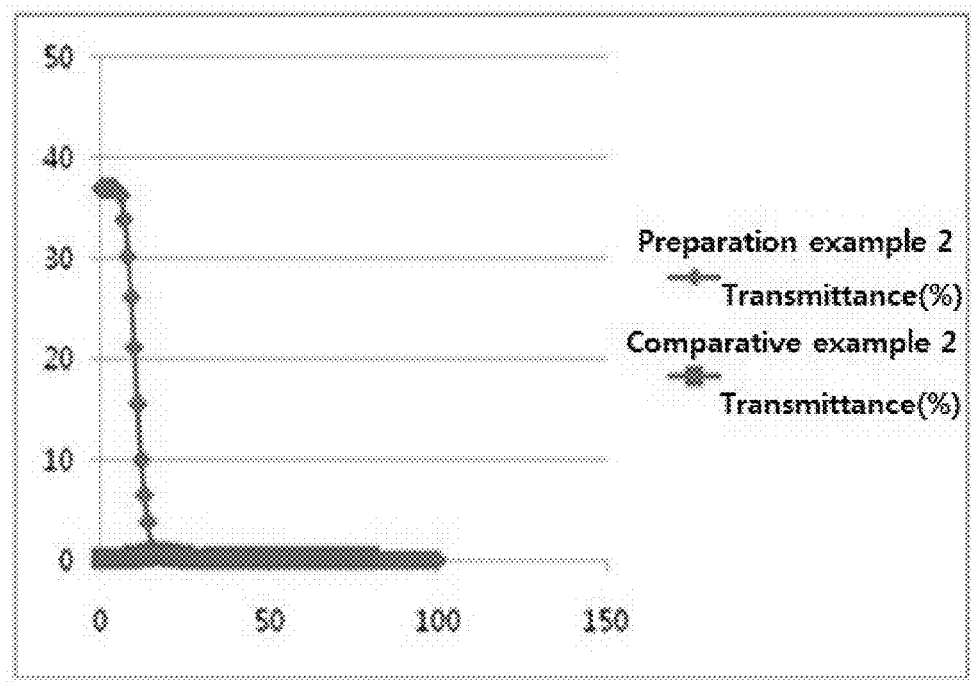

[FIG. 6]
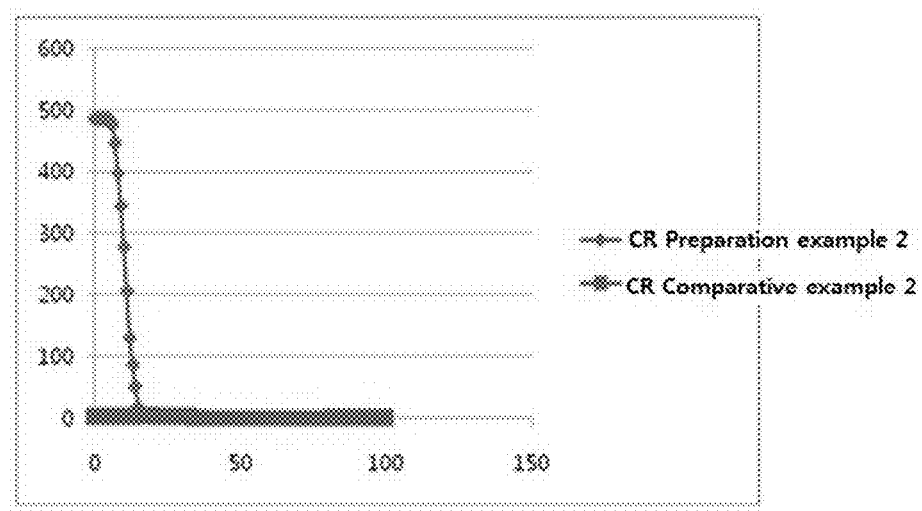

METHOD FOR PREPARING LIQUID CRYSTAL CAPSULE

CROSS-REFERENCE TO RELATED APPLICATIONS

This application is a 35 U.S.C. § 371 National Phase Entry Application from PCT/KR2015/001877, filed on Feb. 26, 2015, and designating the United States, which claims priority under 35 U.S.C. § 119 to Korean Patent Application No. 10-2014-0022463, filed on Feb. 26, 2014, and Korean Patent Application No. 10-2015-0027199, filed on Feb. 26, 2015, the entire contents of which are incorporated herein by reference.

TECHNICAL FIELD

The present application relates to a method of preparing a liquid crystal capsule, a liquid crystal capsule and the use of the liquid crystal capsule.

BACKGROUND ART

Liquid crystal capsules are generally prepared by stirring liquid crystals and a material for a capsule film using a stirrer. However, in this case, it is difficult to uniformly realize the size of the liquid crystal capsule. In liquid crystal display devices using liquid crystal capsules having a non-uniform size, electro-optical properties vary according to the size of the liquid crystal capsule, and since the size of the liquid crystal capsule is nonuniform, scattering occurs due to the difference between the refractive indexes of a liquid crystal and a capsule film forming the liquid crystal capsule, thereby causing the problem of decreased optical properties.

DISCLOSURE

Patent Document (Patent document 1) Japanese Patent Application No. 2006-252877

Technical Problem

The present application is directed to providing a method of preparing a liquid crystal capsule, a liquid crystal capsule and the used of the liquid crystal capsule.

Technical Solution

According to an aspect of the present application, there is provided a method of preparing a liquid crystal capsule, which includes mixing a liquid crystal solution including a liquid crystal compound and a lipophilic reactive compound with a first aqueous solution including a nonionic surfactant, and forming liquid crystal drops dispersed in the aqueous solution; and mixing the mixture in which liquid crystal drops are formed and a second aqueous solution including a hydrophilic compound which is polymerized with the lipophilic reactive compound or induces polymerization with the lipophilic reactive compound, and inducing a reaction of the lipophilic reactive compound at an interface of the liquid crystal drops and an aqueous solution.

In comparison with an existing preparation method of a liquid crystal capsule, in which a liquid crystal is added to a polymer aqueous solution and a shear force is applied thereto, one of the features of the present application is that a liquid crystal compound is used as a solvent.

In the present application, when a liquid crystal compound is used as a solvent, it denotes that an excess amount of a liquid crystal compound is applied in a liquid crystal solution, as compared to an amount of a lipophilic reactive compound, to serve as a solvent.

Accordingly, in an embodiment, the liquid crystal solution may include the lipophilic reactive compound at 5 to 60 parts by weight with respect to 100 parts by weight of the liquid crystal compound. For example, the lipophilic reactive compound may be included at 5 to 50 parts by weight, or 10 to 40 parts by weight with respect to 100 parts by weight of the liquid crystal compound.

When the liquid crystal capsule is prepared using the liquid crystal compound as a solvent, the liquid crystal capsule having a uniform size may be prepared, the size of the liquid crystal capsule may be easily adjusted, and thus a liquid crystal cell applied with the liquid crystal capsule has an advantage of excellent optical properties.

Further, one of the features of the present application is that a material which does not form ions in an aqueous solution is used in the overall process of preparing a liquid crystal capsule. When ions are formed in the preparation process of the liquid crystal capsule, a reaction may non-uniformly occur due to the formed ions. On the other hand, when a nonionic material which does not form ions in an aqueous solution is used, ions are not formed in a reaction process, and thus a reaction may uniformly occur. Accordingly, the liquid crystal capsule having a uniform size may be prepared, and the optical properties of the liquid crystal cell applied to the prepared liquid crystal capsule may be improved. For example, the nonionic material includes a nonionic surfactant and a nonionic radical initiator as will be described below.

The method of preparing a liquid crystal capsule according to the embodiment of present application includes forming liquid crystal drops and forming a polymer shell. The forming of the liquid crystal drops includes mixing a liquid crystal solution including a liquid crystal compound and a lipophilic reactive compound with a first aqueous solution including a nonionic surfactant, and forming liquid crystal drops dispersed in the aqueous solution.

In the embodiment, liquid crystal compound may be a nematic liquid crystal compound, but is not limited thereto. For example, the difference between the extraordinary refractive index and the ordinary refractive index of the liquid crystal compound may be in the range of 0.01 to 0.4 or 0.01 to 0.3. In the present specification, unless otherwise described, a refractive index refers to a refractive index measured based on a wavelength of 550 nm. Further, the liquid crystal compound may be a positive liquid crystal compound having a difference of 2 to 40 between the extraordinary permittivity and the ordinary permittivity thereof or a negative liquid crystal compound having a difference of −1 to −20 between the extraordinary permittivity and the ordinary permittivity thereof.

According to the embodiment, a lipophilic reactive compound may be a compound having a solubility of 1 wt % or less in a 1 molar concentration (1 M) of a sodium chloride aqueous solution. In the embodiment, the solubility of the lipophilic reactive compound in a 1 molar concentration (1 M) of a sodium chloride aqueous solution may be 0.5 wt % or less, 0.3 wt % or less, 0.2 wt % or less or 0.1 wt % or less.

In the embodiment, the lipophilic reactive compound may be an electrophile or a radical reactive compound.

The electrophile may be a polyvalent isocyanate compound, a polyvalent epoxy compound, or a polyvalent isothiocyanate compound, but is not limited thereto. In the present specification, a "polyvalent" compound refers to a compound including two or more functional groups, and the polyvalent compound may be, for example, a compound including 2 to 10, 2 to 8, 2 to 6, or 2 to 4 functional groups. For example, the electrophile may be one or more types selected from the group consisting of isophorone diisocyanate, toluene diisocyanate, diphenyl methane diisocyanate, trimethylene diisocyanate, tetramethylene diisocyanate, hexamethylene diisocyanate, 1,2-propylene diisocyanate, 1,2-butylene diisocyanate, butylidene diisocyanate, dithiohexylmethane diisocyanate, 1,3-cyclopentane diisocyanate, 1,4-cyclohexane diisocyanate, 1,3,5-benzene triisocyanate, 1,2,4-benzene triisocyanate, and a mixture thereof.

In the embodiment, the radical reactive compound may be a thiol compound, a vinyl ether compound, or an acrylate compound. For example, the radical reactive compound may be one or more types selected from the group consisting of trimethylolpropane triacrylate, trimethylolpropane ethoxy triacrylate, glycerine propoxylated triacrylate, pentaerythritol triacrylate, pentaerythritol tetraacrylate, pentaerythritol pentaacrylate, dipentaerythritol triacrylate, dipentaerythritol tetraacrylate, dipentaerythritol hexaacrylate, urethaneacrylate, esteracrylate, epoxyacrylate, etheracrylate, tripropyleneglycol diacrylate, lauryl acrylate, acryl pendant, and benzyl methacrylate.

According to the embodiment, the liquid crystal solution may further include an anisotropic dye.

In the embodiment, the anisotropic dye may have the maximum light absorption wavelength in the range of 400 to 1500 nm, and the dichroic ratio in the range of 2 to 15.

In the embodiment, the anisotropic dye may be included at 0.1 to 5 parts by weight, 0.1 to 3 parts by weight, 0.2 to 2 parts by weight, or 0.5 to 1.5 parts by weight with respect to 100 parts by weight of the liquid crystal compound.

According to the embodiment, the liquid crystal solution may further include a dispersion stabilizer. When the dispersion stabilizer is included in the liquid crystal solution, the precipitation of liquid crystal drops is prevented, and satisfactory dispersibility may be maintained.

In the embodiment, the dispersion stabilizer may be an alkane, an alcohol, or a perfluoroalkane. For example, the dispersion stabilizer may include hexadecane, cetyl alcohol or perfluorodecane, but is not limited thereto.

In the embodiment, the dispersion stabilizer may be included at 1 to 10 parts by weight, 3 to 8 parts by weight, or 4 to 7 parts by weight with respect to 100 parts by weight of the liquid crystal compound.

Any surfactant which is not ionized in an aqueous solution may be used without limitation as the nonionic surfactant used to form liquid crystal drops. The types of the nonionic surfactant are well known in the related field, and any known nonionic surfactant may be used without limitation. In the embodiment, the nonionic surfactant may be an amphiphilic block copolymer, a polyoxyethylene alkyl ether, a polyoxyethylene fatty acid ester, a sorbitol fatty acid ester, or a glycerin fatty acid ester. For example, the nonionic surfactant includes cetomacrogol 1000, cetostearyl alcohol, cetyl alcohol, cocamide diethanolamine (cocamide DEA), cocamide monoethanolamine (cocamide MEA), decyl glucoside, Igepal CA-630, isoceteth-20, lauryl glucoside, monolaurin, octylphenoxypolyethoxyethanol, nonoxynol-9, NP-40, octaethylene glycol monododecyl ether, N-octyl beta-D-thioglucopyranoside, octyl glucoside, oleyl alcohol, pentaethylene glycol monododecyl ether, poloxamer, polyglycerol polyricinolate, polysorbate, sorbitan monostearate, sorbitan tristearate, stearyl alcohol, Triton X-100, Tween 80, poly(ethylene oxide-b-propylene oxide), polyoxyethylene-b-polydimethyl siloxane, or the like, but is not limited thereto. For example, the nonionic surfactant may be poly(ethylene oxide-b-propylene oxide). When poly(ethylene oxide-b-propylene oxide) is used as the nonionic surfactant, the unit of ethylene oxide and the unit of propylene oxide may be included in the weight ratio of 4:6 to 2:8.

According to the embodiment, a first aqueous solution may include the nonionic surfactant at 0.01 to 5.0 parts by weight, 0.01 to 3 parts by weight, 0.01 to 1 parts by weight, 0.05 to 1 parts by weight, or 0.1 to 0.5 parts by weight with respect to 100 parts by weight of water.

According to the embodiment, liquid crystal drops may be formed by applying a shear force to the mixture of the liquid crystal solution and the first aqueous solution. The application of the shear force may be performed using a treatment of ultrasonic waves or magnetic stirring, a high pressure homogenizer, a microfluidic channel, Shirasu porous glass (SPG), etc.

In the embodiment, the shear force may be applied such that an average particle diameter of the liquid crystal drops is 400 nm or less, 350 nm or less, or 300 nm or less. The size of the formed liquid crystal drops varies according to the intensity of the shear force applied to the mixture of the liquid crystal solution and the first aqueous solution. Accordingly, when the intensity of the shear force is adjusted, the size of liquid crystal drops may be adjusted.

According to the embodiment, the liquid crystal solution may further include a low-polarity volatile compound. The low-polarity volatile compound may be a compound having a dielectric constant of 1 to 5, and/or a compound having a boiling point of 50 to 80° C.

The low-polarity volatile compound may be included at 180 to 350 parts by weight with respect to 100 parts by weight of the liquid crystal compound.

Further, the forming of the polymer shell includes mixing the mixture in which the liquid crystal drops are formed and a second aqueous solution including a hydrophilic compound which is polymerized with the lipophilic reactive compound or induces polymerization with the lipophilic reactive compound, and inducing a reaction of the lipophilic reactive compound at the interface of the liquid crystal drops and an aqueous solution.

The polymer shell of the liquid crystal capsule is formed by the polymerization of the lipophilic reactive compound included in the liquid crystal solution and the hydrophilic compound included in the second aqueous solution, or by the polymerization of the lipophilic reactive compound induced by the hydrophilic compound. For example, when the lipophilic reactive compound is an electrophile, and the hydrophilic compound is a nucleophile, the polymer shell is formed by the polymerization reaction of the electrophile and the nucleophile. Further, when the lipophilic reactive compound is a radical reactive compound, and when the hydrophilic compound is a radical initiator, the polymerization of the radical reactive compound is generated by the radical initiator, and thereby the polymer shell is formed.

According to the embodiment, the hydrophilic compound may be a compound having a solubility of 5 wt % or more in a 1 molar concentration of a sodium chloride aqueous solution. In the embodiment, the hydrophilic compound may have a solubility of 7 wt % or more, 8 wt % or more, 9 wt % or more, or 10 wt % or more in a 1 molar concentration of a sodium chloride aqueous solution.

In the embodiment, the hydrophilic compound may be a nucleophile or a radical initiator.

In the embodiment, the nucleophile may be one or more selected from the group consisting of a polyvalent alcohol compound, a polyvalent amine compound, a polyvalent aminoalcohol compound, a polyvalent thiol compound, a polyvalent hydroxy thiol compound, a polyvalent aminothiol compound, a polyvalent amino acid compound, and a polyvalent mercapto carboxylic acid compound. For example, the polyvalent alcohol may be, for example, a divalent to decavalent alcohol, and include a divalent alcohol such as an alkylene glycol having 2 to 20 carbon atoms, for example, such as butylene glycol, propylene glycol, ethylene glycol, and the like, or a trivalent alcohol such as an alkane triol having 3 to 20 carbon atoms, for example, such as glycerine, butane-1,2,3-triol, and the like.

In the embodiment, the nucleophile may be included at 0.1 to 10 parts by weight, 1 to 7 parts by weight, or 1.5 to 5 parts by weight with respect to 100 parts by weight of water.

The radical initiator refers to a material capable of generating the polymerization of the radical reactive compound, and the radical initiator may be a nonionic radical initiator in the present application. Any known nonionic radical initiator which does not form ions in an aqueous solution may be used without limitation. For example, the nonionic radical initiator may be an azo compound. The azo compound includes 2,2'-azobis[2-(2-imidazoline-2-yl)propane], 2,2'-azobis[2-(2-imidazoline-2-yl)propane]dihydrochloride, 2,2'-azobis[2-(2-imidazoline-2-yl)propane]disulfate dihydrate, 2,2'-azobis(2-methyl propionamide)dihydrochloride, 2,2'-azobis[N-(2-carboxyethyl)-2-methyl propionamide]hydrate, 2,2'-azobis{2-[1-(2-hydroxyethyl)-2-imidazoline-2-yl]propane}dihydrochloride, 2,2'-azobis(1-imino-1-pyrrolidino-2-ethylpropane)dihydrochloride, 2,2'-azobis{2-methyl-N-[1,1-bis(hydroxymethyl)-2-hydroxyethyl] propionamide}, 2,2'-azobis[2-methyl-N-(2-hydroxyethyl) propionamide], VPE-0601, VPE-0201, VPE-040, etc.

In the embodiment, the second aqueous solution may further include a nonionic surfactant. The types of the nonionic surfactant are the same as described above.

According to the embodiment, the second aqueous solution may include the nonionic surfactant at 0.01 to 3.0 parts by weight, 0.01 to 1 parts by weight, 0.05 to 1 parts by weight, or 0.05 to 0.5 parts by weight with respect to 100 parts by weight of water.

Further, according to another aspect of the present application, there is provided a liquid crystal capsule which includes a core part including a liquid crystal compound and a polymer shell surrounding the liquid crystal compound.

According to the embodiment, the liquid crystal capsule may be prepared according to the preparation method of the liquid crystal capsule described above.

In the embodiment, the liquid crystal compound may be a nematic liquid crystal compound, but is not limited thereto. For example, the liquid crystal compound may be a liquid crystal compound having a difference in the range of 0.01 to 0.4 or 0.01 to 0.3 between the extraordinary refractive index and the ordinary refractive index. In the present specification, unless otherwise described, a refractive index refers to a refractive index measured based on a wavelength of 550 nm. Further, the liquid crystal compound may be a positive liquid crystal compound having a difference of 2 to 40 between the extraordinary permittivity and the ordinary permittivity thereof or a negative liquid crystal compound having a difference of −1 to −20 between the extraordinary permittivity and the ordinary permittivity thereof.

In the embodiment, the core part may further include an anisotropic dye.

In the embodiment, the anisotropic dye may have the maximum light absorption wavelength in the range of 400 to 1500 nm, and the dichroic ratio in the range of 2 to 15.

In the embodiment, the core part may include the anisotropic dye at 0.1 to 5 parts by weight, 0.1 to 3 parts by weight, 0.2 to 2 parts by weight, or 0.5 to 1.5 parts by weight with respect to 100 parts by weight of the liquid crystal compound.

Further, according to still another aspect of the present application, there is provided the use of the liquid crystal capsule. The liquid crystal capsule according to the embodiment of present application may be used in various applicable liquid crystal optical modulators. Accordingly, the present application provides an optical modulator which includes a substrate; and a liquid crystal layer formed on one surface of the substrate and including the liquid crystal capsule. The preparation method or type of the optical modulator is well known in the related field, and the optical modulator may be prepared using a known preparation method without limitation. The optical modulator includes a smart window, an isotropic film, a polarization control film, flexible LCD, or the like, but is not limited thereto.

The optical modulator using the liquid crystal capsule according to the embodiment of the present application has an advantage that the optical properties thereof are excellent.

Advantageous Effects

The liquid crystal capsule prepared according to an embodiment of the present application has advantages in that transmittance and stability are improved and the degree of scattering is uniform.

DESCRIPTION OF DRAWINGS

FIG. 1 shows a structure of a liquid crystal capsule according to an embodiment of present application.

FIG. 2 shows TEM and SEM images of the liquid crystal capsule according to an embodiment of present application.

FIG. 3 shows a TEM image of the liquid crystal capsule according to an embodiment of present application.

FIG. 4 shows a result of the comparison of the transmittance between the liquid crystal cell applied with the liquid crystal capsule according to the embodiment of present application and a conventional liquid crystal cell.

FIG. 5 shows a result of the comparison of the contrast (CR) between the liquid crystal cell applied with the liquid crystal capsule according to the embodiment of present application and a conventional liquid crystal cell. In FIG. 5, a horizontal axis indicates a driving voltage (V), and a vertical axis indicates transmissivity (%).

FIG. 6 shows a result of the comparison of the transmittance between the liquid crystal cell applied with the liquid crystal capsule according to the embodiment of present application and a conventional liquid crystal cell. In FIG. 6, a horizontal axis indicates a driving voltage (V), and a vertical axis indicates contrast (CR).

MODES OF THE INVENTION

Hereinafter, the present application will be described in detail in conjunction with examples, but the scope of the present application is not limited to the following examples.

Example 1

0.3 g of a liquid crystal compound (ML 0223; Merck & Co. Inc., the difference between the extraordinary refractive index and the ordinary refractive index: 0.0799, the difference between the extraordinary permittivity and the ordinary permittivity: 3.9), 0.7 g of hexane and 100 mg of isophorone diisocyanate (IPDI; solubility in an 1M NaCl aqueous solution: 0.015 wt %) were mixed, 20 mg of hexadecane was added thereto, and thereby a liquid crystal solution was prepared. A first aqueous solution prepared by mixing 3.5 g of water and 7 mg of poly(ethylene oxide-b-propylene oxide) (PEO-b-PPO; a weight ratio (EO:PO) of an ethylene oxide unit (EO) to a propylene oxide unit (PO)=2:8) was mixed with the liquid crystal solution, and thereby the mixture thereof was prepared. The mixture was put into of a flask containing ice water, a shear force was applied thereto through an ultrasonic wave treatment while a temperature was maintained in the range of about 10 to 20° C., and thereby liquid crystal drops were formed. The ultrasonic wave treatment was performed using a Branson sonifier W450 digital (tip size: 6.5 mm) device, with an amplitude of 70%, in an ON/OFF manner (turned ON for 15 seconds, and OFF for 5 seconds) for 300 seconds, such that liquid crystal drops having an average particle diameter of about 350 nm were formed. A mixture including 38 mg of glycerine (solubility in an 1M NaCl aqueous solution: 50 wt %), 1 g of water and 1.7 mg of poly(ethylene oxide-b-propylene oxide) (PEO-b-PPO; a weight ratio (EO:PO) of an ethylene oxide unit (EO) to a propylene oxide unit (PO)=4:6) was mixed with the mixture in which liquid crystal drops were formed, the mixture was stirred at room temperature for about 2 hours, and then further stirred at about 65° C. for about 24 hours to form liquid crystal capsules. The synthesized liquid crystal capsules were separated using a centrifuge, were cleaned three times by about 4 g of water, were dried in an oven at 40° C. for 20 hours, and thereby about 280 mg of powder which includes liquid crystal capsules having a diameter of about 200 nm were obtained. The powder was mixed with about 5 mg of poly(ethylene oxide-b-propylene oxide) (PEO-b-PPO; a weight ratio (EO:PO) of an ethylene oxide unit (EO) to a propylene oxide unit (PO)=3:7), about 180 mg of polyvinyl alcohol and about 3 g of water, and thereby the mixture of liquid crystal capsules (LMC-1) was prepared. In the above description, the average particle diameter of the liquid crystal capsules was measured through a dynamic light scattering (DLS) method, which is the same as below.

Example 2

0.3 g of a liquid crystal compound (HPC 2160; HCCH, the difference between the extraordinary refractive index and the ordinary refractive index: 0.241, the difference between the extraordinary permittivity and the ordinary permittivity: 18.2), and 100 mg of toluene diisocyanate (TDI; solubility in an 1M NaCl aqueous solution: <0.1 wt %) were mixed, 20 mg of hexadecane was added thereto, and thereby a liquid crystal solution was prepared. A first aqueous solution prepared by mixing 3.5 g of water and 7 mg of poly(ethylene oxide-b-propylene oxide) (PEO-b-PPO; a weight ratio (EO:PO) of an ethylene oxide unit (EO) to a propylene oxide unit (PO)=2:8) was mixed with the liquid crystal solution, and thereby the mixture thereof was prepared. The mixture was put into of a flask containing ice water, a shear force was applied thereto through an ultrasonic wave treatment while a temperature was maintained in the range of about 10 to 20° C., and thereby liquid crystal drops were formed. The ultrasonic wave treatment was performed using a Branson sonifier W450 digital (tip size: 6.5 mm) device, with an amplitude of 70%, in an ON/OFF manner (turned ON for 15 seconds and OFF for 5 seconds) for 300 seconds, such that liquid crystal drops having an average particle diameter of about 400 nm were formed. A second aqueous solution prepared by mixing 18 mg of ethylenediamine (solubility in an 1M NaCl aqueous solution: 10 wt %), 10 mg of propane 1,2,3-triamine (solubility in an 1M NaCl aqueous solution: 15 wt %), 1 g of water and 1.7 mg of poly(ethylene oxide-b-propylene oxide) (PEO-b-PPO; a weight ratio (EO:PO) of an ethylene oxide unit (EO) to a propylene oxide unit (PO)=4:6) was mixed with the mixture in which liquid crystal drops were formed, the mixture was stirred at room temperature for about 2 hours, and then further stirred at about 65° C. for about 24 hours to form liquid crystal capsules. After the liquid crystal capsules were formed, the liquid crystal capsules were separated using a centrifuge, were cleaned three times by about 4 g of water, were dried in an oven at 40° C. for 20 hours, and thereby about 250 mg of powder which includes liquid crystal capsules having a diameter of about 300 nm were obtained. The powder was mixed with about 4.5 mg of poly(ethylene oxide-b-propylene oxide) (PEO-b-PPO; a weight ratio (EO:PO) of an ethylene oxide unit (EO) to a propylene oxide unit (PO)=3:7), 170 mg of polyvinyl alcohol and about 3 g of water, and thereby a mixture of liquid crystal capsules (LMC-2) was prepared.

Example 3

0.3 g of a liquid crystal compound (HPC 2160; HCCH, the difference between the extraordinary refractive index and the ordinary refractive index: 0.241, the difference between the extraordinary permittivity and the ordinary permittivity: 18.2), 50 mg of tripropyleneglycol diacrylate (solubility in an 1M NaCl aqueous solution: 0.031 wt %), 10 mg of pentaerythritol triacrylate (PETA; solubility in an 1M NaCl aqueous solution: 0.022 wt %), 40 mg of benzyl methacrylate (solubility in an 1M NaCl aqueous solution: 0.014 wt %) were mixed, 20 mg of hexadecane was added thereto, and thereby a liquid crystal solution was prepared. A first aqueous solution prepared by mixing 3.5 g of water and 7 mg of poly(ethylene oxide-b-propylene oxide) (PEO-b-PPO; a weight ratio (EO:PO) of an ethylene oxide unit (EO) to a propylene oxide unit (PO)=2:8) was stirred into the liquid crystal solution, and thereby the mixture thereof was prepared. The mixture was put into of a flask containing ice water, a shear force was applied thereto through an ultrasonic wave treatment while a temperature was maintained in the range of about 10 to 20° C., and thereby liquid crystal drops were formed. The ultrasonic wave treatment was performed using a Branson sonifier W450 digital (tip size: 6.5 mm) device, with an amplitude of 70%, in an ON/OFF manner (turned ON for 15 seconds and OFF for 5 seconds) for 300 seconds, such that liquid crystal drops having an average particle diameter of about 350 nm were formed. Thereafter, a second aqueous solution prepared by mixing 5 mg of a water-soluble radical initiator (VA057, Wako Pure Chemical Industries Ltd., solubility in an 1M NaCl aqueous solution: 34.7 wt %), 1 g of water and 1.7 mg of poly(ethylene oxide-b-propylene oxide) (PEO-b-PPO; a weight ratio (EO:PO) of an ethylene oxide unit (EO) to a propylene oxide unit (PO)=4:6) was mixed with the mixture in which liquid crystal drops were formed, the mixture was stirred at room temperature for about 2 hours, and then further stirred at about 80° C. for about 12 hours to form liquid crystal capsules. The liquid crystal capsules were separated using a centrifuge, were cleaned three times by about 4 g of water, were dried in an oven at 40° C. for 20 hours, and thereby about 300 mg of powder which includes liquid crystal capsules having a diameter of about 250 nm were obtained. 300 mg of the powder was added with 4.5 mg of poly (ethylene oxide-b-propylene oxide) (PEO-b-PPO; a weight ratio (EO:PO) of an ethylene oxide unit (EO) to a propylene oxide unit (PO)=3:7), 170 mg of polyvinyl alcohol and 3 g of water, and thereby a mixture of liquid crystal capsules (LMC-3) was prepared. The shape of the prepared mixture (LMC-3) was identified by taking TEM and SEM images thereof (FIG. 2).

Example 4

0.3 g of a liquid crystal compound (ZGS8017; JNC Corporation, the difference between the extraordinary refractive index and the ordinary refractive index: 0.11, the difference between the extraordinary permittivity and the ordinary permittivity: 3.4), and 100 mg of toluene diisocyanate (TDI; solubility in an 1M NaCl aqueous solution: <0.1 wt %) were mixed, 20 mg of hexadecane was added thereto, and thereby a liquid crystal solution was prepared. A first aqueous solution prepared by mixing 3.5 g of water and 15 mg of poly(ethylene oxide-b-propylene oxide) (PEO-b-PPO; a weight ratio (EO:PO) of an ethylene oxide unit (EO) to a propylene oxide unit (PO)=2:8) was mixed with the liquid crystal solution, and after stirring, the mixture thereof was prepared. The mixture was put into of a flask containing ice water, a shear force was applied thereto through an ultrasonic wave treatment while a temperature was maintained in the range of about 10 to 20° C., and thereby liquid crystal drops were formed. The ultrasonic wave treatment was performed using a Branson sonifier W450 digital (tip size: 6.5 mm) device, with an amplitude of 70%, in an ON/OFF manner (turned ON for 15 seconds, and OFF for 5 seconds) for 300 seconds, such that liquid crystal drops having an average particle diameter of about 250 nm were formed. A second aqueous solution prepared by mixing 18 mg of ethylenediamine (solubility in an 1M NaCl aqueous solution: 10 wt %), 10 mg of propane 1,2,3-triamine (solubility in an 1M NaCl aqueous solution: 15 wt %), 1 g of water and 1.7 mg of poly(ethylene oxide-b-propylene oxide) (PEO-b-PPO; a weight ratio (EO:PO) of an ethylene oxide unit (EO) to a propylene oxide unit (PO)=4:6) was mixed with the mixture in which liquid crystal drops were formed, the mixture was stirred at room temperature for about 2 hours, and then further stirred at about 65° C. for about 24 hours to form liquid crystal capsules. The liquid crystal capsules were separated using a centrifuge, were cleaned three times by 4 g of water, were dried in an oven at 40° C. for 20 hours, and thereby about 260 mg of powder which includes liquid crystal capsules having a diameter of about 200 nm were obtained. The powder was added with 4.5 mg of poly(ethylene oxide-b-propylene oxide) (PEO-b-PPO; a weight ratio (EO:PO) of an ethylene oxide unit (EO) to a propylene oxide unit (PO)=3:7), 170 mg of polyvinyl alcohol and 3 g of water, and thereby a mixture of liquid crystal capsules (LMC-4) was prepared.

The shape of the prepared mixture (LMC-4) was identified by taking a TEM image thereof (FIG. 3).

Example 5

0.3 g of a liquid crystal compound (HPC 2160; HCCH, the difference between the extraordinary refractive index and the ordinary refractive index: 0.241, the difference between the extraordinary permittivity and the ordinary permittivity: 18.2), 3 mg of an anisotropic black dye (IRGA-PHOR Black X12DC) and 100 mg of toluene diisocyanate (TDI; solubility in an 1M NaCl aqueous solution: <0.1 wt %) were mixed, and thereby a liquid crystal solution was prepared. A first aqueous solution prepared by mixing 3.5 g of water and 7 mg of poly(ethylene oxide-b-propylene oxide) (PEO-b-PPO; a weight ratio (EO:PO) of an ethylene oxide unit (EO) to a propylene oxide unit (PO)=2:8) was stirred into the liquid crystal solution, and thereby the mixture thereof was prepared. The mixture was put into of a flask containing ice water, a shear force was applied thereto through an ultrasonic wave treatment while a temperature was maintained in the range of about 10 to 20° C., and thereby liquid crystal drops were formed. The ultrasonic wave treatment was performed using a Branson sonifier W450 digital (tip size: 6.5 mm) device, with an amplitude of 70%, in an ON/OFF manner (turned ON for 15 seconds and OFF for 5 seconds) for 300 seconds, such that liquid crystal drops having an average particle diameter of about 2,100 nm were formed. A second aqueous solution prepared by mixing 18 mg of ethylenediamine (solubility in an 1M NaCl aqueous solution: 10 wt %), 10 mg of propane 1,2,3-triamine (solubility in an 1M NaCl aqueous solution: 15 wt %), 1 g of water and 1.7 mg of poly(ethylene oxide-b-propylene oxide) (PEO-b-PPO; a weight ratio (EO:PO) of an ethylene oxide unit (EO) to a propylene oxide unit (PO)=4:6) was added thereto, the mixture was stirred at room temperature for about 2 hours, and then further stirred at about 65° C. for about 24 hours to form liquid crystal capsules. The liquid crystal capsules were separated using a centrifuge, were cleaned three times by 4 g of water, were dried in an oven at 40° C. for 20 hours, and thereby about 250 mg of powder which includes liquid crystal capsules having a diameter of about 2,100 nm were obtained. 250 mg of the powder was added with 4.5 mg of poly(ethylene oxide-b-propylene oxide) (PEO-b-PPO; a weight ratio (EO:PO) of an ethylene oxide unit (EO) to a propylene oxide unit (PO)=3:7), 155 mg of polyvinyl alcohol and 3 g of water, and thereby a mixture of liquid crystal capsules (LMC-5) was prepared.

Preparation Example 1

The mixture (LCM-5) prepared in Example 5 was added with a silica ball spacer (SP-210; SEKISUI CHEMICAL CO., LTD.) having an average particle diameter of about 10 μm at a concentration of about 1.5 wt %, the mixture was mixed for uniform dispersion, and thereby a coating solution was prepared. A surface provided with indium tin oxide (ITO) of a poly(ethylene terephthalate) (PET) film having ITO formed on one side thereof was coated with the coating solution using a slit coater, and then the coating layer was dried in an oven at 100° C. for about 50 minutes. Thereafter, a well-known ultraviolet curable sealant was applied on the edges of the dried coating layer to have a width of about 1 mm, the ITO surface of the PET film having ITO formed on one side thereof as above was bonded to the coating layer to face each other, the sealant was cured using a Fusion UV exposure device (H-bulb), and thereby an optical modulator (liquid crystal cell) was prepared.

Preparation Example 2

The mixture (LCM-1) prepared in Example 1 was added with a silica ball spacer (SP-210; SEKISUI CHEMICAL CO., LTD.) having an average particle diameter of about 10 μm at a concentration of about 1.5 wt %, the mixture was mixed for uniform dispersion, and thereby a coating solution was prepared. An isotropic film having an electrode wiring patterned thereon was coated with the coating solution using a slit coater. As the isotropic film having an electrode wiring patterned thereon, the isotropic film having double layers of polycarbonate-poly(methyl methacrylate) (PC-PMMA), which had a hard coating layer formed on one side of a polycarbonate (PC) layer and had a stripe Al wiring with a width of 1 μm patterned on the hard coating layer, was used. After coating, the coated layer was dried in an oven at 100° C. for about 50 minutes. Thereafter, a well-known ultraviolet curable sealant was applied on the edges of the dried coating layer to have a width of about 1 mm, an ITO-PC/PMMA film having ITO deposited on a front side thereof was bonded to the coating layer, the sealant was cured using a Fusion UV exposure device (H-bulb) with an amplitude of 70% and at a rate of 3 m/min. Polarizing plates having absorption axes in an orthogonal direction were adhered to each of the upper and lower plates of the cured material, and thereby an optical modulator (film-type liquid crystal cell) was prepared.

Preparation Examples 3 to 5

Optical modulators (film-type liquid crystal cell) were prepared in Preparation Examples 3 to 5, in the same manner as in Preparation Example 2 except that mixtures ranging from the mixture (LCM-2) prepared in Example 2 to the mixture (LCM-4) prepared in Example 4 were respectively applied in Preparation Examples 3 to 5 instead of using the mixture (LCM-1) prepared in Example 1.

Comparative Example 1

A solution prepared by mixing 65 g of a liquid crystal compound (HPC 2160; HCCH, the difference between the extraordinary refractive index and the ordinary refractive index: 0.241, the difference between the extraordinary permittivity and the ordinary permittivity: 18.2), 0.65 g of an anisotropic black dye (IRGAPHOR Black X12DC), 5 g of 1,6-hexanediol diacrylate (HDDA), 20 g of 2-ethylhexyl acrylate (EHA), 5 g of Ebecryl 810, 2 g of pentaerythritol triacrylate (PETA), and 5 g of diphenyl(2,4,6-trimethylbenzoyl)phosphine oxide (TPO) which is a photoinitiator was added with a silica ball spacer (SP-210; SEKISUI CHEMICAL CO., LTD.) having an average particle diameter of about 10 μm at a concentration of about 1.5 wt %, the mixture was mixed for uniform dispersion, and thereby a coating solution was prepared. The surface provided with indium tin oxide (ITO) of a poly(ethylene terephthalate) (PET) film having ITO formed on one side thereof was coated with the coating solution using a slit coater, and then the coating layer was dried in an oven at 100° C. for about 10 minutes. Thereafter, the ITO surface of the PET film having ITO formed on one side thereof as above was bonded to the dried coating layer to face each other, the sealant was cured using a Fusion UV exposure device (H-bulb) with an amplitude of 70% and at a rate of 3 m/min, and thereby an optical modulator (liquid crystal cell) was prepared.

Comparative Example 2

A film-type polymer-dispersed liquid crystal (PDLC) cell was prepared in the same manner as in Comparative Example 1 except that an anisotropic black dye were not applied in the preparation process of the coating solution, and a film having double layers of PC-PMMA, which had a hard coating layer formed on one side of a PC layer, was applied instead of the PET film having ITO formed thereon. Two polarizing plates having absorption axes orthogonal to each other were adhered to each of the upper and lower plates of the prepared film-type PDLC cell, and thereby an optical modulator (film-type liquid crystal cell) was prepared.

Experimental Example 1

Comparison of Variable Level of Transmittance

Transmittance according to the applied voltage in the liquid crystal cell prepared in Preparation Example 1 was compared with that in Comparative Example 1. Transmittance was shown as the total amount of transmission which is the sum of the transmission amounts of straight light and scattered light, and measured using a haze meter.

As a result, as shown in FIG. 4, the transmittance in the liquid crystal cell prepared in Preparation Example 1 was determined to be more excellent.

The result shows that the optical properties of the optical modulator provided with the liquid crystal capsule according to the embodiment of present application are excellent.

Experimental Example 2

Comparison of Variable Level of Contrast (CR) and Transmittance

The variable level of CR and transmittance in the liquid crystal cell prepared in Preparation Example 2 was compared with that in the liquid crystal cell which is applied to polarizing plates and prepared in Comparative Example 2, and the result was shown in each of FIGS. 5 and 6.

As a result, the transmittance (FIG. 5) and contrast (FIG. 6) of the liquid crystal cell prepared in Preparation Example 2 were determined to be more excellent that those of the liquid crystal cell prepared in Comparative Example 2.

The result shows that the optical properties of the optical modulator provided with the liquid crystal capsule according to the embodiment of present application are excellent.

The invention claimed is:

1. A method of preparing a liquid crystal capsule, comprising:
    mixing a liquid crystal solution including a liquid crystal compound and a lipophilic reactive compound with a first aqueous solution including a nonionic surfactant to obtain a mixed solution,
    applying a shear force to the mixed solution such that liquid crystal drops are formed and dispersed in the first aqueous solution and an average particle diameter of the liquid crystal drops is 400 nm or less; and
    mixing the mixed solution in which the liquid crystal drops are formed with a second aqueous solution that includes a hydrophilic compound which is polymerized with the lipophilic reactive compound or induces polymerization with the lipophilic reactive compound, such that a reaction of the lipophilic reactive compound is induced at interfaces of the liquid crystal drops and the second aqueous solution, and
    wherein the second aqueous solution further includes a nonionic surfactant.

2. The method of claim 1, wherein the liquid crystal solution includes the lipophilic reactive compound at 5 to 60 parts by weight with respect to 100 parts by weight of the liquid crystal compound.

3. The method of claim 1, wherein the liquid crystal compound is a nematic liquid crystal compound.

4. The method of claim 1, wherein the liquid crystal compound has a difference in a range of 0.01 to 0.4 between an extraordinary refractive index and an ordinary refractive index.

5. The method of claim 1, wherein the lipophilic reactive compound has a solubility of 1 wt % or less in a 1 molar concentration of a sodium chloride aqueous solution.

6. The method of claim 1, wherein the lipophilic reactive compound is an electrophile or a radical reactive compound.

7. The method of claim 6, wherein the electrophile is a polyvalent isocyanate compound, a polyvalent epoxy compound, or a polyvalent isothiocyanate compound.

8. The method of claim 6, wherein the radical reactive compound is a thiol compound, a vinyl ether compound, or an acrylate compound.

9. The method of claim 1, wherein the liquid crystal solution further includes an anisotropic dye.

10. The method of claim 9, wherein the anisotropic dye is included at 0.1 to 5 parts by weight with respect to 100 parts by weight of the liquid crystal compound.

11. The method of claim 1, wherein the liquid crystal solution further includes a dispersion stabilizer.

12. The method of claim 11, wherein the dispersion stabilizer is an alkane, an alcohol, or a perfluoroalkane.

13. The method of claim 1, wherein the nonionic surfactant is an amphiphilic block copolymer, a polyoxyethylene alkyl ether, a polyoxyethylene fatty acid ester, a sorbitol fatty acid ester, or a glycerin fatty acid ester.

14. The method of claim 13, wherein the amphiphilic block copolymer is poly(ethylene oxide-b-propylene oxide).

15. The method of claim 1, wherein the hydrophilic compound has a solubility of 5 wt % or more in a 1 molar concentration of a sodium chloride aqueous solution.

16. The method of claim 1, wherein the hydrophilic compound is a nucleophile or a radical initiator.

17. The method of claim 16, wherein the nucleophile is at least one selected from the group consisting of a polyvalent alcohol compound, a polyvalent amine compound, a polyvalent aminoalcohol compound, a polyvalent thiol compound, a polyvalent hydroxy thiol compound, a polyvalent aminothiol compound, a polyvalent amino acid compound, and a polyvalent mercapto carboxylic acid compound.

18. The method of claim 16, wherein the radical initiator is a nonionic radical initiator.

19. A method of manufacturing an optical modulator, comprising:
coating a coating solution comprising the liquid crystal capsule prepared by the method of claim 1 onto an isotropic film having an electrode wiring patterned to form a coating layer; and
bonding a film having an electrode disposed on a side thereof to manufacture a liquid crystal cell.

20. The method of claim 19, further comprising: adhering polarizing plates having absorption axes in an orthogonal direction to an upper plate and a lower plate of the liquid crystal cell.

21. The method of claim 9, wherein the anisotropic dye has a maximum light absorption wavelength in a range of 400 to 1500 nm, and a dichroic ratio in a range of 2 to 15.

* * * * *